Jan. 18, 1966 W. OPITZ ETAL 3,230,339
METHOD FOR WELDING WORKPIECES BY MEANS OF A BEAM
OF CHARGE CARRIERS
Filed Sept. 16, 1963 3 Sheets-Sheet 1

INVENTOR.
WOLFGANG OPITZ
FRITZ SCHLEICH
BY KLAUS KOCH
KARL-HEINZ STEIGERWALD

Jan. 18, 1966     W. OPITZ ETAL     3,230,339
METHOD FOR WELDING WORKPIECES BY MEANS OF A BEAM
OF CHARGE CARRIERS
Filed Sept. 16, 1963     3 Sheets-Sheet 3

INVENTOR.
WOLFGANG OPITZ
FRITZ SCHLEICH
BY KLAUS KOCH
KARL-HEINZ STEIGERWALD

United States Patent Office
3,230,339
Patented Jan. 18, 1966

3,230,339
METHOD FOR WELDING WORKPIECES BY MEANS OF A BEAM OF CHARGE CARRIERS
Wolfgang Opitz, Oberkochen, Wurttemberg, Fritz Schleich, Unterkochen, Wurttemberg, Klaus Koch, Aalen, Wurttemberg, and Karl-Heinz Steigerwald, Heidenheim (Brenz), Wurttemberg, Germany, assignors, by mesne assignments, to United Aircraft Corporation, East Hartford, Conn., a corporation of Delaware
Filed Sept. 16, 1963, Ser. No. 308,969
Claims priority, application Germany, Sept. 15, 1962, Z 9,660
2 Claims. (Cl. 219—121)

This invention relates to welding, and, more particularly, to an improved method and apparatus for welding using a beam of charge carriers.

It is already known that two workpieces can be welded together by directing an intense beam of electrons onto the desired point of weld. In order to produce a weld seam, the workpieces which are to be welded together can be moved with respect to a stationary beam of electrons in such a manner that the beam always impinges the place of abutment of the two workpieces, and the desired weld seam is, thus, produced at the abutting edges.

In this connection it is necessary to feed the power of the beam of electrons in a favorably selected space, power and time-distribution to the weld seam. Unfortunately, it is difficult to attain a desired weld seam even with careful control.

It is, therefore, an object of the present invention to provide an improved method and apparatus for welding by means of a beam of charge carriers.

The method and apparatus of the invention can best be understood in view of the figures and, thus, reference is now made to the accompanying drawings, of which:

In FIGS. 1–4, there is shown various weld seams, useful in explaining welding difficulties of the prior art and the present method.

Figure 1:
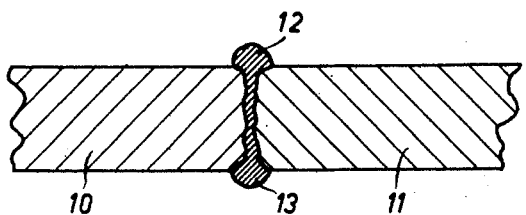
FIGS. 1–3 are sectional views of a weld seam taken across the seam and illustrate various weld seam shapes.

In FIG. 1, there is shown a section transverse to the weld seam in which 10 and 11 are the workpieces to be welded together, and the weld seam is indicated by the narrow closely hatched surface. It is desirable to obtain a weld seam between the workpieces 10 and 11 which are to be welded together having heads extending above the surfaces, i.e. a so-called upper bead 12 and a so-called lower bead 13, since with such a weld, it is possible by simple subsequent working to obtain readily full smoothness of the weld, while weld seams which have a depression on the surface of the workpiece would be very unsatisfactory.

Experience now shows that this form of weld can frequently not be obtained.

If the intensity is selected too low, then the workpieces 10 and 11 which are to be welded together are not completely connected to each other, but rather a welding is obtained in the cross section shown in FIG. 2 between the two workpieces only over a fraction of the entire thickness D while below this point of weld, the two workpieces do not adhere to each other at all. An upper bead 14 is formed under these conditions on the top side of the point of weld.

Figure 2:
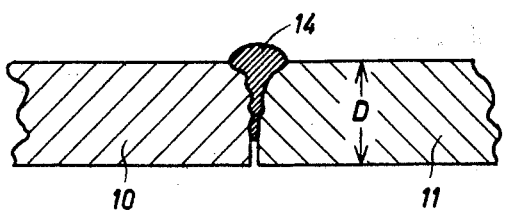
Figure 3:
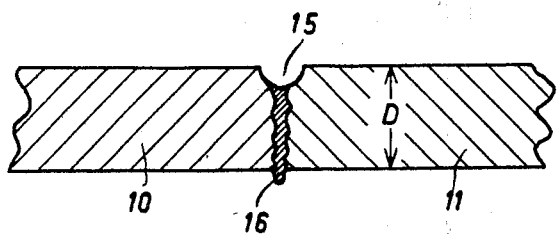

If, on the other hand, the intensity of the beam of charge carriers is selected too high, the conditions shown in the sectional view of FIG. 3 result. The two workpieces are, to be sure, welded together over the entire thickness D, but there is produced on the top side, in contradistinction to the upwardly convex bead 14 shown in FIG. 2, a concave upper bead 15, i.e. a depression at the place of weld. This is due to the fact that with complete melting of the material at the point of contact of the two workpieces, the melted material will flow out downward from the point of weld (within certain limits) thus, in this case, the downwardly convex lower bead 16, shown in FIG. 3, is formed. The production of the extremely undesirable concave upper bead or depression 15, can therefore be understood.

Experience shows now that it is very difficult to adjust the intensity of the beam of charge carriers so as to avoid, on the one hand, an imperfect formation of the weld seam in accordance with FIG. 2, and, on the other hand, not to melt the point of weld so greatly that the lower bead 16 shown in FIG. 3, together with the extremely undesired upper depression 15 is produced.

In order to avoid these difficulties, it is now proposed in accordance with the present invention to subject the beam to periodic deflection in the direction of the weld seam.

Figure 4:
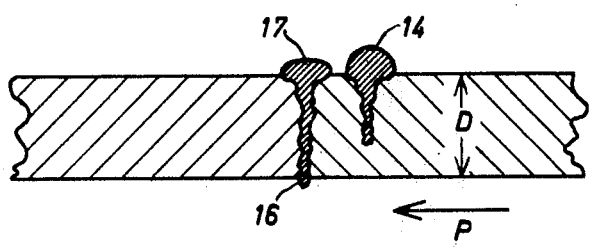
FIG. 4 is a sectional view of a weld seam taken along the seam to illustrate the present method.

If it is assumed that this periodic deflection is produced by means of a keystone-shaped current having upper and lower peaks of the same length, then the condition shown in FIG. 4 would be obtained. FIG. 4 shows a section taken in the plane of the weld and reveals that the beam of charge carriers, corresponding to its keystone-shaped deflection, pentrates into the material at two different points lying one behind the other in the direction of the weld seam. If the two workpieces which are to be welded together with each other can be moved in the direction of the arrow P with respect to a beam of charge carriers impinging from above onto the workpieces, then if the density of the beam is proper, no complete welding throughout is obtained during the front position of the beam (to the right of FIG. 4), but rather only a welding of a fraction of the entire distance D, and in this way there is again formed an upper bead 14, since during this phase of the welding process, the same conditions are present as in FIG. 2. In the rear position (to the left of FIG. 4) the beam then impinges upon a position of the weld seam which is still incompletely welded throughout, i.e. it has not welded the two workpieces to be connected together over the entire thickness D. The energy of the beam of charge carrier need not be greater in this rear position than in the front position in order completely to weld the incomplete weld formed during the front position, i.e. to connect the two workpieces with each other over the balance of the total thickness D. In this connection, there is then first of all formed a lower bead 16 for the reasons explained with reference to FIG. 3 and furthermore the material present in the upper bead 14 of FIG. 4 flows into the depression produced at the upper end of the weld seam, so that with suitable manner of operation in no case need a depression on the top side of the two workpieces be feared, but rather there is produced an upper bead 17 which, so to say, represents the balance of the previously formed upper bead 14.

Experience has shown that in this manner, the extremely unpleasant phenomenon of a concave upper bead 15 as shown in FIG. 3 can be avoided.

Another improvement of this welding process in accordance with the present invention consists of the additional step of periodically deflecting the beam transverse to the seam in combination with the above described periodic deflection of the beam of charge carriers in the longitudinal direction of the weld seam.

During the welding of materials which have a high vapor pressure at their melting point, the beam of charge carriers penetrates into the material to be welded and a relatively large amount of material evaporates without at the same time a sufficient quantity of the bordering material being melted, as is absolutely necessary in order that the necessary coherence of the two workpieces to be connected together can be created by the flowing together of the molten material. In this case, the marginal districts of the seam must be additionally heated by the transverse deflection.

It can furthermore happen that the two workpieces which are to be welded to each other are relatively sensitive to local overheating, such as is true, for example, in the case of hardenable steels, as well as in the case of molybdenum and tungsten. Accordingly, cracks can, under unfavorable conditions, be formed in the material during the welding. This danger can also be reduced by deflection of the beam of charge carriers transverse to the longitudinal direction of the weld seam.

A periodic deflection of the beam of electrons transverse to the weld seam is already known in the two following cases of use.

In the first of these cases, there is concerned the production of so-called V-shaped weld seams, i.e. the connection by welding of two workpieces, the planes of which are perpendicular to each other and which are to be welded together at the line of intersection of the two planes. In this case, it is known to produce at the point of contact of the two workpieces a weld seam first by a sharply focused beam of electrons and thereupon to again go over the weld seam with an electron beam which is subjected to periodic transverse deflection. In this manner, the result is to be obtained that such a weld seam is completely filled up with molten, and then resolidified material.

In the second case, there is concerned the welding together of two workpieces which are separated from each other by a parallel-weld of equal or greater transverse length than the cross section of the beam of electrons. In this case, the beam of electrons is also subjected to periodic transverse deflection so that it covers a narrow marginal region on both sides of the gap. In this case, thereupon, a narrow marginal zone of both workpieces is liquefied and the liquefied material moves together, forming a dependable welded seam upon the further movement of the beam of electrons.

In neither of these two cases, however, is there concerned the problem which forms the basis of the present invention in connection with the production of the weld seam which has been produced with a beam of charge carriers periodically deflected in the longitudinal direction of the seam, or assuring a melting of sufficient quantities of material on both sides of the weld seam to be produced.

One device with which the method of the invention can be carried out is shown schematically in FIG. 5 and will be described below.

Figure 5:
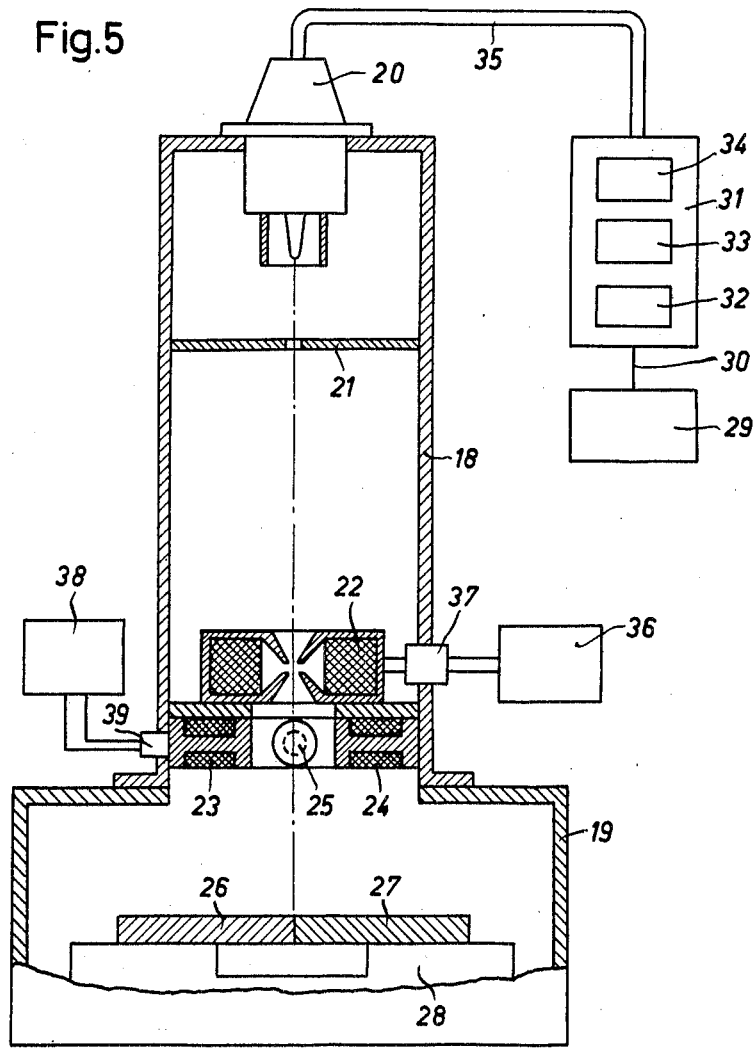
FIG. 5 is a sectioned view, in schematic form, of apparatus for performing the method of the present invention.

In FIG. 5, there is shown an electron beam welder comprising a metal housing 18 in which the means for producing, focusing and deflecting a beam of electrons are arranged, and which is located above a working housing 19. The housings 18 and 19 are shown in cross section. On the top of the housing 18, there is a feed-in insulator 20; within this housing there is an anode aperture 21, as well as an electron-optical magnetic lens in the form of a coil 22 and an electromagnetic deflection system, to produce a deflection field lying in the plane of the drawing by means of two coils 23 and 24 and a deflection field perpendicular to the plane of the drawing by two coils of which only the pole 25 of the one coil is shown. In the machining housing 19, there are shown in cross section the two workpieces 26 and 27 which are to be welded together. The weld seam is to be produced at the abutting edge of these two workpieces. The two workpieces are located on a table 28, which is displaceable by means of a device (not shown) perpendicular to the plane of the drawing which is within the machining housing 19.

A rectangle 29 indicates an apparatus for producing a high voltage of, for example, 150 kv. which is connected via a line 30 with a housing 31 which comprises an apparatus 32 for producing a heating current for the cathode, an apparatus 33 for producing control pulses for the control cylinder of the electron beam generator and an apparatus 34 for producing an adjustable bias voltage for the said control cylinder. The apparatus 31 is connected via a cable 35 with a grounded cover with the connecting lines lying in the insulator 20 for the cathode and the control cylinder.

The coil 22 is fed from the suitable source of direct voltage 36 which is connected with the terminals of the electron lens via a lead through insulator 37.

The two pairs of deflection coils in the deflection coil system 23 to 25 are fed via a lead-through insulator 39 from a source of current 38 which can generate current of various waveforms, as will be explained further below.

In order to explain the manner of operation of the method in accordance with the present invention, let us first of all assume that the table 28 is moving perpendicularly to the plane of the drawing in FIG. 5, in the direction from the front towards the rear.

Figure 6:
FIG. 6 is a plot of the waveform generated for use with the apparatus of FIG. 5.

The deflection coils 23 and 24 are now fed, for example, an alternating current of trapezoidal shape, having horizontal peaks of equal length as shown in FIG. 6 via an A.C. coupling. The two workpieces 26 and 27 which are to be welded together are then impinged by the beam of electrons first of all while the upper beam of the keystone-shaped current is passed through at a point which is located in space in front of the point at which the workpieces are impinged during the lower horizontal beam of the keystone-shaped current. It can, therefore, be seen that the weld seam of FIG. 4 is produced by the apparatus of FIG. 5 and when driven by a deflection current as shown in FIG. 6. During the upper beam of the trapezoidal-shaped current curve of FIG. 6, there is produced the hatched region shown to the right in FIG. 4 which corresponds to an incomplete welding together of the two workpieces, and during the lower peak of the deflection current waveforms, there is produced the hatched area of complete welding shown to the left in FIG. 4.

The coil 25 and the corresponding coaxially located deflection coil in FIG. 5 are still without current in the case of this method.

The improvement of the method in accordance with the invention which has been described above resulting from periodic deflection of the electron beam transverse to the weld seam can, for example, be carried out with a sinusoidal current. When using such a sinusoidal current, the energy fed over the entire width of the surface covered by the electron beam is not distributed precisely as formerly, but the marginal zones of this area receive a greater amount of energy than the center of the area.

A uniform distribution can, however, be obtained by feeding the deflection coil 25 and the corresponding coaxially located deflection coil with a current having a rooftop or sawtooth shape.

Figure 7:
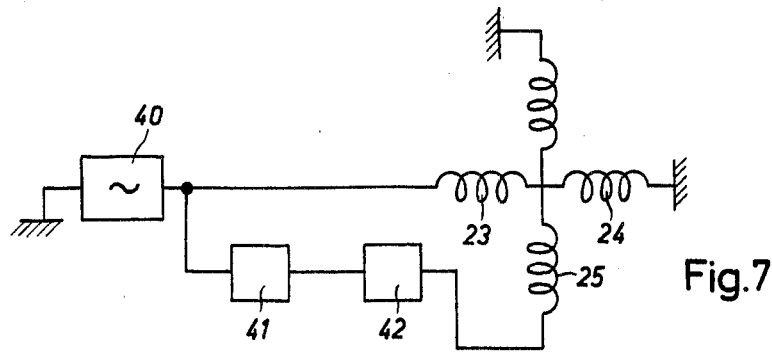
FIGS. 7 and 8 are schematic diagrams of specific deflection system circuits for use in the apparatus of FIG. 5.

Another arrangement for producing a deflection transverse to the weld seam will be described with reference to FIG. 7. Herein 40 is a generator (shown schematically) which can supply a sinusoidal curve shape for feeding the coils 23 and 24 in FIG. 5. In the direction of the weld seam, the beam is, therefore, deflected in a manner similar to that in which it is deflected by the current in accordance with FIG. 6. To the current generator 40, there is connected a frequency divider 41 which is capable of dividing the frequency of the generator 40 in a ratio of 5:1, while to the frequency divider 41, there is connected a pulse generator 42 which upon each output pulse of the frequency divider 41 can supply a short negative and thereupon a short positive pulse. The output pulses of the pulse generator 42 flow through the deflection coil 25, and the corresponding coaxial deflection coil, and the electron beam will, therefore, when using a circuit in accordance with FIG. 7, be sinusoidally deflected not only in the direction of the weld seam, but at regular intervals of five cyclic lengths of the sinusoidal curve also for a short time transversely to the weld seam in both directions, so that therefore the material on both sides of the weld seam is in addition melted or preheated. By selecting the frequency-division ratio of the divider 41 and by selection of the curve shape of the pulse generator 42, it is possible to control the magnitude of this effect.

Figure 8:
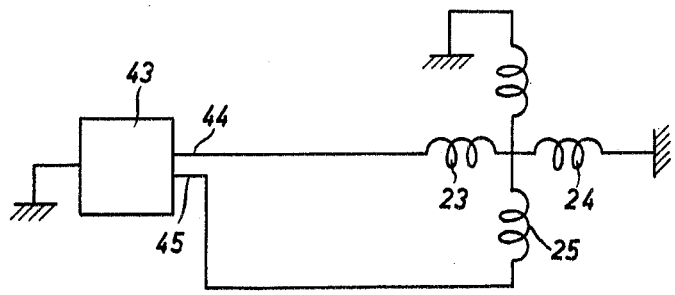

On the basis of FIG. 8, there will now be discussed a very simple circuit arrangement, by means of which the electron beam can be imparted a circular or elliptical movement.

A sinusoidal current generator 43, of for example 50 cycles, supplies at its two output terminals 44 and 45 two output currents which are staggered 90° with respect to each other. To the terminal 44, the deflection coils 23 and 24 are connected, and to the terminal 45, the deflection coil 25 and the corresponding coaxial deflection coil. The amplitude of the deflections in the direction of the weld seam transverse to the direction of the weld seam is equal in the case of the circuit according to FIG. 8 when the voltage at the output terminals 44 and 45 is equal; otherwise, the beam passes over an elliptical path.

This invention may be variously modified and embodied within the scope of the subjoined claims.

What is claimed is:

1. The method of welding workpieces along a seam by means of a beam of charge carriers comprising the steps of focusing the beam on a first point along said seam, adjusting the intensity of the beam so that it will penetrate only partially into the seam, welding the workpieces together over only a portion of the seam depth and producing a protruding weld bead on the upper surface of the seam during said penetration, then directing the beam on a second point closely adjacent said first point and along said seam to produce a second protruding weld and then directing the beam with substantially the same intensity on said first protruding weld bead at said first point to completely weld the workpieces to the full seam depth, forming a weld bead protruding on both sides of the seam.

2. The method according to claim 1 which includes the step of periodically deflecting the beam transversely to the direction of the weld seam.

References Cited by the Examiner
UNITED STATES PATENTS

| | | | |
|---|---|---|---|
| 2,942,098 | 6/1960 | Smith | 219—121 |
| 2,989,614 | 6/1961 | Steigerwald. | |
| 3,033,974 | 5/1962 | Schleich et al. | |
| 3,131,289 | 4/1964 | Hansen | 219—121 |
| 3,134,013 | 5/1964 | Opitz et al. | 219—121 |
| 3,172,989 | 3/1965 | Nelson | 219—121 |

ANTHONY BARTIS, *Acting Primary Examiner.*

JOSEPH V. TRUHE, *Examiner.*